July 10, 1973  T. O. TONGUE  3,744,976

VENTING DEVICE

Filed Nov. 23, 1970

Thomas O. Tongue
INVENTOR

BY Michael J. McGreal
Attorney

United States Patent Office 3,744,976
Patented July 10, 1973

3,744,976
VENTING DEVICE
Thomas O. Tongue, Baltimore, Md., assignor to
W. R. Grace & Co.
Filed Nov. 23, 1970, Ser. No. 91,910
Int. Cl. B01d 39/00, 46/00; C01f 7/58
U.S. Cl. 23—260                                    8 Claims

ABSTRACT OF THE DISCLOSURE

This invention concerns a device which, in combination with a secondary condenser system, effectively removes particulate matter and noxious noncondensible fumes such as chlorine gas from an air stream mixture. In one embodiment, it comprises a pressure compensating secondary condenser which is vented into a chamber having a glass wool or similar fibrous layer and an adsorbent or reactive material layer, this second layer removing the noxious gas from the gas-air stream. In a particular embodiment, this device is used in the venting of aluminum chloride condensers to the atmosphere, with the adsorbent or reactive layer being preferably a flake caustic.

BACKGROUND OF THE INVENTION

This invention relates to a device for reactively removing noxious gases from a gaseous stream prior to venting to the atmosphere. In one embodiment, this invention relates to a device useful on reactors and condensers for removing gaseous chlorine or similar noxious gas prior to its being vented into the atmosphere, and particularly for use on aluminum chloride condensers.

Although useful for reactively removing essentially any noxious gas prior to venting to the atmosphere, the device of this invention will be set out for the removal of chlorine gas, and particularly for use in equipment used in the production of aluminum chloride. In aluminum chloride production, the metal is contacted with chlorine gas at an elevated temperature in a reaction chamber. Vaporous metal chloride is produced which is then fed to a condenser chamber so that it may be solidified and collected. The vaporous metal chloride solidifies mainly by crystallization on the cooler internal surfaces of this condenser chamber. This condenser chamber is operated at atmospheric pressure and is thus usually open at some point to the atmosphere. In many installations, any vaporous chlorine containing fumes are allowed to vent directly into the atmosphere. However, with more stringent anti-pollution ordinances being adopted, such procedures are not acceptable.

The use of presently available commercial scrubbers in combination with aluminum chloride condensers have failed to solve this problem and yield acceptable results. The prime disadvantage of scrubbers is that such devices in operation develop a suction to pull vapors and gases into the scrubbing unit. When in combination with an aluminum chloride condenser, this suction acts also to pull amounts of vaporous chlorides into the condenser, thus decreasing the yield of aluminum chlorides, and producing deposits in the scrubbing unit. The device of the present invention, however, is effective where scrubbers have failed. This device does not require a suction force, when used in combination with a secondary condenser, does not decrease the aluminum chloride yield, and vents essentially no chlorine or chlorine products into the atmosphere. Further, the present device is simple in construction and maintenance, as well as being the most effective device available.

It is an object of this invention to set out an effective method for removing particulate matter and noxious chlorine fumes from the vent stacks of aluminum chloride condenser chambers.

It is also an object of this invention to set out an inexpensive and simple device for use in combination with aluminum chloride process equipment which reactively removes any noxious chlorine prior to any venting to the atmosphere.

It is additionally an object of this invention to utilize in combination with more than one aluminum chloride condenser chamber a vent gas purifying device which does not operate by drawing a suction from the condenser chamber.

It is further an object of this invention to set out a vent air purifying device which comprises a packed chamber which removes any entrained fines as well as noxious chlorine gas.

BRIEF SUMMARY OF THE INVENTION

This invention comprises a vent gas purifying device which may be used in combination with aluminum chloride condenser chambers. The purifying device in the preferred mode consists of a secondary condenser chamber in combination with a container having at least one layer of glass wool and at least one layer of a reactive or adsorbent material. The device in a preferred use effectively vents aluminum chloride primary condenser chambers to the atmosphere without causing any deleterious backpressure or suction forces in the condenser chambers. Any noxious chlorine or other gases, and any particulate aluminum or other compounds are removed by this device precluding any venting into the atmosphere.

DETAILED DESCRIPTION OF THE INVENTION

Broadly, this invention comprises a unique, simple and very effective method for venting one or more reactor or condenser chambers to the atmosphere, and in a particular mode for the venting of rare earth chloride or aluminum chloride condenser chambers to the atmosphere. The problem with venting such chambers is that fine particulate aluminum chloride and other aluminous materials, and noxious chlorine gases must not be allowed to pass out into the atmosphere. The emission of such substances would be contrary to anti-pollution ordinances as well as being corrosive to surrounding plant equipment. The filter device of this invention in its preferred mode comprises a secondary condenser chamber in communication with a first and primary condenser chamber, this secondary condenser being in combination with a container containing at least one layer of glass wool and at least one layer of a noxious gas adsorbing or reactive material. For chlorine gas, this reactive material is effectively caustic on similar highly alkaline solid material. By the use of this combination device, the secondary condenser serves to remove most of the residual aluminum chloride carried over from the primary condenser, with the filter device then removing any other particulate aluminous material and any noxious chlorine gases.

Figure 1:
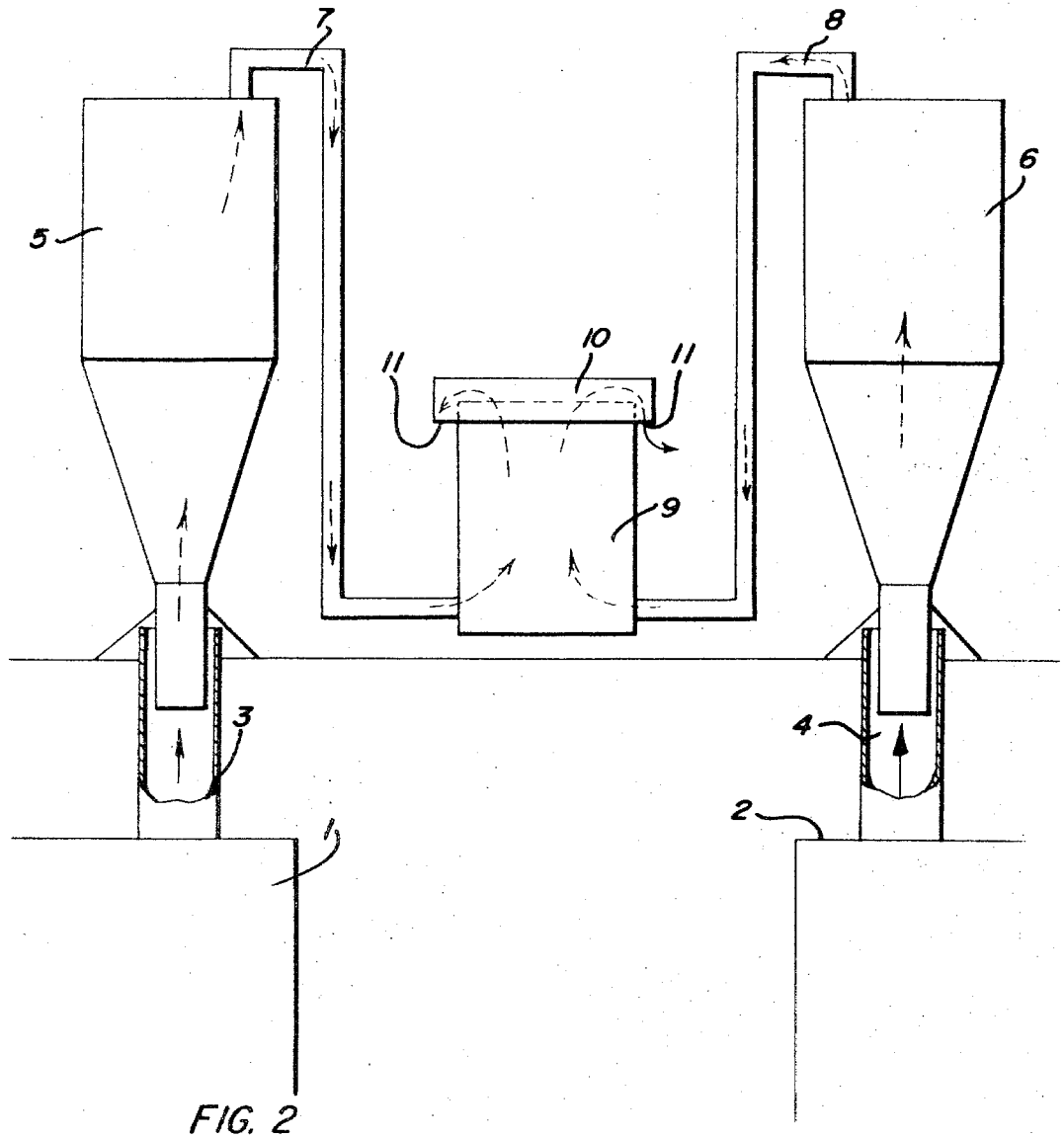
FIG. 1 is an elevational view of the filter device used in combination with two condenser units.
Figure 2:
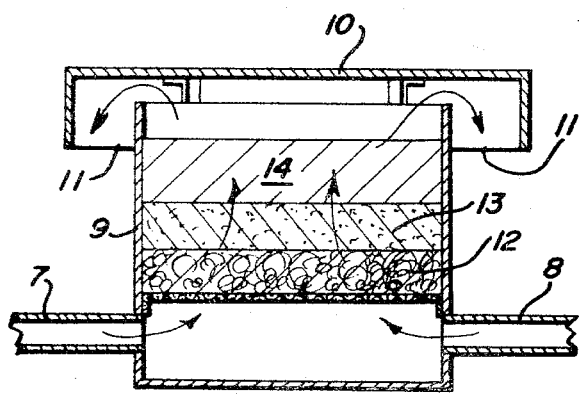
FIG. 2 is a cross-section view of the filter container of FIG. 1.

This invention will now be set out in more detail with reference to the appended figures, and for simplicity will be set out using aluminum chloride. In FIG. 1, 1 and 2 are primary condenser chambers commonly used in the production of aluminum chloride. These primary condenser chambers receive a vaporous aluminum chloride feed from a reactor wherein molten aluminum is exothermally reacted with chlorine gas. Most of the aluminum chloride is precipitated in these primary condensers and collected. In the past it has been conventional in some instances to vent these primary condensers directly to the atmosphere. However, problems of surrounding plant equipment corrosion and atmospheric pollution are obvious. Others have attempted to use a scrubber incombination with this primary condenser, but have failed since the suction force of the scrubber units pull in some vaporous aluminum chloride product. The present invention comprises secondary condensers 5 and 6 connected to the primary condensers that serve primarily to precipitate out any remaining aluminum chloride, as well as serving as single chambers for minimizing any sudden pressure changes on the filter device. These primary and secondary condensing chambers are preferably of a type as set out in U.S. patent application 65,405, now U.S. Patent 3,679,477, issued July 25, 1972. There is no suction or pulling force exerted to pull the gases or vaporous materials into the secondary condensers, transport being solely by convection. Any substances not precipitated or crystallized out in the secondary condensers are allowed to pass unrestricted through conduits 7 and 8 to chamber 9. Chamber 9 is a reactive filter chamber which removes any particulate matter and any noxious chlorine gases. 10 is a chamber cap and 11 vents to the atmosphere. This chamber 9 contains both the particulate fines and noxious gas removing materials.

FIG. 2 is a cross-section of chamber 9, setting out a preferred construction for this filter container. This comprises a fibrous layer 12, such as glass wool, an adsorbent or reactive material layer 13, and optionally a further fibrous layer 14. The layer 13 may be a reactive flake caustic or an adsorbent such as zeolite A, or some other material which is reactive with chlorine or hydrogen chloride or adsorbs these gases. In operation, the fibrous glass wool layer removes particulate aluminum chloride or aluminous materials while the flake caustic or other similar highly alkaline material removes chlorine and hydrogen chloride. A preferred construction of container 11 is to have opening means in at least one wall of the container so that the glass wool, reactive or adsorbing material can be replenished. In one preferred mode, the device comprises separate canisters for the caustic and glass wool layers so that either of these layers may be rapidly and separately replaced as required. The container 9 is then sealed and continued in use.

The canisters of fibrous or flake caustic are essentially these materials in non-corroding foraminous enclosures. These enclosures, as well as the entire container 9, are constructed of materials not affected by the chlorine, hydrogen chloride or other gaseous atmosphere which it will be in contact with. Such materials are stainless steel alloys and plastics. Also useful are plastic coated metals which may be susceptible to corrosion.

Although the suitable adsorbing and reactive materials have been specifically disclosed as flake caustic and zeolite A, essentially any other highly alkaline or any known material which readily reacts with or adsorbs the evolved noxious gas may be used. These very operably include the alkaline and alkaline earth hydroxides, carbonates, bicarbonates and so on. Other useful adsorbents include the amorphous and crystalline zeolites, as well as many organic ion exchange resins.

The fibrous layer, although preferably a glass wool, may also be layers of woven glass fibers, or may be fibrous plastic materials such as Teflon.

What is claimed is:
1. A venting device for an aluminum chloride primary condenser comprising in combination:
   a secondary aluminum chloride condensing chamber;
   a conduit means connecting said primary aluminum chloride condenser with said secondary aluminum chloride condenser;
   a container vented at a top portion and containing at least one layer of a fibrous material which removes particulate matter and at least one layer of a material to remove chlorine gases; and
   conduit means connecting said secondary condensing chamber with said container.
2. A venting device as in claim 1 wherein said container contains at least one layer of glass wool and at least one layer of a chlorine gas reactive material which is highly alkaline.
3. A venting device as in claim 2, wherein said chlorine gas reactive highly alkaline material is selected from the group consisting of alkali hydroxides, alkaline earth hydroxides, alkali carbonates, alkali bicarbonates and alkaline earth bicarbonates.
4. A venting device as in claim 1 wherein said container contains at least one layer of glass wool and at least one layer of a chlorine gas adsorbing material.
5. A venting device for two aluminum chloride primary condensers comprising in combination:
   two secondary aluminum chloride condensing chambers;
   conduit means connecting a first primary aluminum chloride condenser to a first secondary aluminum chloride condenser, and conduit means connecting a second primary aluminum chloride condenser to a second secondary aluminum chloride condenser;
   a container vented at a top portion and containing at least one layer of fibrous material which removes particulate matter and at least one layer of a material to remove chlorine gases; and
   conduit means connecting each of said secondary aluminum chloride condensing chambers with said container.
6. A venting device as in claim 5, wherein said material to remove chlorine gases is a reactive highly alkaline material selected from the group consisting of alkali hydroxides, alkaline earth hydroxides, alkali carbonates, alkali bicarbonates and alkaline earth bicarbonates.
7. A venting device as in claim 6 wherein said fibrous material is a layer of glass wool.
8. A venting device as in claim 5 wherein said container contains at least one layer of glass wool and at least one layer of a chlorine gas adsorbing material.

References Cited
UNITED STATES PATENTS

| | | | |
|---|---|---|---|
| 1,566,269 | 12/1925 | Burgess | 23—93 |
| 1,641,503 | 9/1927 | Prichard et al. | 23—93 |
| 2,325,657 | 8/1943 | Burkness | 55—316 X |
| 3,197,942 | 8/1965 | Haisty et al. | 55—71 |
| 3,406,501 | 10/1968 | Watkins | 55—316 |
| 3,487,440 | 12/1969 | Newsteder | 210—169 |
| 3,582,262 | 6/1971 | Tomany | 55—71 X |

JOSEPH SCOVRONEK, Primary Examiner

U.S. Cl. X.R.

23—284; 55—71, 316; 423—215, 240, 241